United States Patent [19]

Takagi et al.

[11] Patent Number: 5,088,427
[45] Date of Patent: Feb. 18, 1992

[54] RELATIVELY SLIDING ARRANGEMENT FOR USE IN SEWING MACHINE

[75] Inventors: Atsuhiro Takagi, Kariya; Mitsuru Muto, Kasugai; Jun Isono, Nagoya, all of Japan

[73] Assignee: Brother Kogyo Kabushiki Kaisha, Aichi, Japan

[21] Appl. No.: 508,174

[22] Filed: Apr. 12, 1990

[30] Foreign Application Priority Data

Apr. 26, 1989 [JP] Japan .................. 1-106255

[51] Int. Cl.⁵ .................. D05B 71/02; D05B 71/00
[52] U.S. Cl. .................................................. 112/256
[58] Field of Search .............. 112/256, 280, 199, 200, 112/312, 323; 384/206, 276, 463, 445, 462; 428/698, 699, 701; 184/5, 6.15

[56] References Cited

U.S. PATENT DOCUMENTS

| | | | |
|---|---|---|---|
| 2,035,928 | 3/1936 | Smith | 112/256 |
| 2,056,644 | 10/1936 | Clayton | 112/256 |
| 3,272,164 | 9/1966 | Keller | 112/256 |
| 3,472,188 | 10/1969 | Hayes | 112/323 |
| 3,785,310 | 1/1974 | Marforio | 112/256 |
| 4,543,896 | 10/1985 | De Santis | 112/199 |
| 4,664,595 | 5/1987 | Tsuji et al. | 415/170 R |
| 4,728,582 | 3/1988 | Comans et al. | 428/699 |
| 4,806,080 | 2/1989 | Mizobuchi et al. | 417/353 |
| 4,824,262 | 4/1989 | Kamigaito et al. | 384/276 |
| 4,848,934 | 7/1989 | Blakely et al. | 384/206 |
| 4,871,266 | 10/1989 | Oda | 384/463 |
| 4,902,576 | 2/1990 | Shimura et al. | 428/698 |

FOREIGN PATENT DOCUMENTS

| | | | |
|---|---|---|---|
| 0701707 | 1/1965 | Canada | 384/462 |
| 48-39464 | 11/1973 | Japan . | |
| 60-31667 | 9/1985 | Japan . | |
| 0270825 | 11/1987 | Japan | 384/462 |
| 63-163026 | 7/1988 | Japan . | |
| 63-167124 | 7/1988 | Japan . | |
| 63-275392 | 11/1988 | Japan . | |
| 2140187 | 11/1990 | Japan | 112/312 |
| 9000640 | 1/1990 | World Int. Prop. O. | 112/200 |

Primary Examiner—Werner H. Schroeder
Assistant Examiner—Ismael Izaguirre
Attorney, Agent, or Firm—Oliff & Berridge

[57] ABSTRACT

An arrangement of two elements of a sewing machine which are in frictional, or sliding, contact during operation. At least one of elements is formed of a ceramic material and a minute amount of a lubrication oil is applied to the frictional, or siding, portion defining the surfaces in contact. Such a combination of elements is found in the upper looper mechanism, the shuttle body assembly, the needle bar mechanism and the fabric piece feeding mechanism in a sewing machine that are subject to high speed, high load friction or sliding conditions.

22 Claims, 9 Drawing Sheets

RELATIVELY SLIDING ARRANGEMENT FOR USE IN SEWING MACHINE

BACKGROUND OF THE INVENTION

The present invention relates to relatively sliding arrangements and more particularly, to such sliding arrangements for use in a sewing machine.

Generally, ceramic materials provide high hardness, low friction coefficients and low heat conductivity comparison with a metallic materials. In this regard, ceramic materials are available for relatively sliding component which are operated at low speed and low load, since significant temperature elevation does not occur at the friction or sliding portions or surfaces. However, if the sliding, or frictional, movement is performed at high speed and high load, temperature at the sliding portions, or friction zones, is elevated to have an abnormally high temperature, thus thermal seizure may occur at the friction, or sliding portions. Accordingly, if the friction or sliding portions are subject to high speed and high load, ceramic material is not an adequate surface due to its insufficient heat conductivity.

If the friction, or sliding, portion is one at which high speeds and high loads are common, in conventional devices, metallic sliding components are used with a great amount of lubrication oil being supplied to the frictional surfaces in order to prevent thermal seizure. However, another consideration must be made with respect to lubrication oil leakage due to the application of a large volume of lubrication oil. Particularly, in case of a sewing machine which deals with a cloth and, therefore, if the lubrication oil is scattered or splashed on the cloth, the resultant product would be rendered unsuitable for the market place.

To avoid this, various countermeasures are required causing an increase in production costs, such as precise control of the lubrication oil supply.

SUMMARY OF THE INVENTION

It is therefore an object of the present to overcome the above described conventional drawbacks and to provide an improved relatively sliding arrangement in which thermal seizure can be obviated even under high speed, high load sliding conditions and yet does not result in the problem of lubrication oil leakage.

These and other objects of this invention are attained by providing a relatively sliding arrangement comprising at least one sliding member having a first sliding portion, at least one opponent sliding member having a second sliding portion, the first and the second sliding portions being in relative sliding contact with each other, and at least one of the first and second sliding portions being formed of a ceramic material having high hardness and high wear resistance, and means for supplying a minute amount of a lubrication oil to the sliding portions.

In another aspect, there is provided a sewing machine comprising an upper looper mechanism, a shuttle body assembly, a needle bar mechanism, a fabric piece feed mechanism, and a lubrication system connected to one of the mechanisms. The upper looper mechanism comprises an upper looper, an upper looper support member for securing the upper looper, and an upper looper guide for slidably guiding movement of the upper looper support member, a first relatively sliding portion including a positive sliding portion and opponent sliding portion between the upper looper support member and the upper looper guide. The shuttle body assembly comprises an external shuttle race body, an internal shuttle body rotatably supported in the shuttle race body with a second relatively sliding portion including a positive sliding portion and opponent sliding portion between the shuttle race body and the shuttle body. The needle bar mechanism comprises a needle bar having a sewing needle attached at one end and a needle bar guide means for slidably guiding the needle bar, a third relative sliding portion including a positive sliding portion and opponent sliding portion between the needle bar and the needle bar guide means.

The fabric piece feed mechanism comprises feed bars each having one end for feeding the fabric piece in a feeding direction, feed dogs fixed to the one end of the feed bars; a feed bar support means for slidably supporting the feed bars in the feed direction; a fourth relatively sliding portion including a positive sliding portion and opponent sliding portion between the feed bars and the feed bar support means. The means for supplying a minute amount of lubrication oil is connected to at least one of the first through fourth relatively sliding portions. At least one of the positive sliding portion and the opponent sliding portion of at least one of the first through fourth relative sliding portions is formed of a ceramic material, and the means for supplying the oil connected to at least one of the positive and opponent sliding portions formed of the ceramic material.

Since at least one of the sliding portions in the relatively sliding members is formed of a ceramic material, and since the ceramic material has high hardness, high wear resistance and low friction coefficient, excellent sliding movement is obtainable even under high speed, high load sliding conditions. Further, since lubrication oil is applied to the relatively sliding portion and the applied oil amount is relatively small, thermal seizure does not occur at the relatively sliding portion and a workpiece, such as a fabric piece, is protected against contamination with the lubrication oil.

DETAILED DESCRIPTION OF THE INVENTION

A relatively sliding system according to the present invention is embodied in an upper looper mechanism of a sewing machine. The upper looper mechanism will be described as a first embodiment of the invention with reference to FIGS. 1 and 2.

Figure 1:
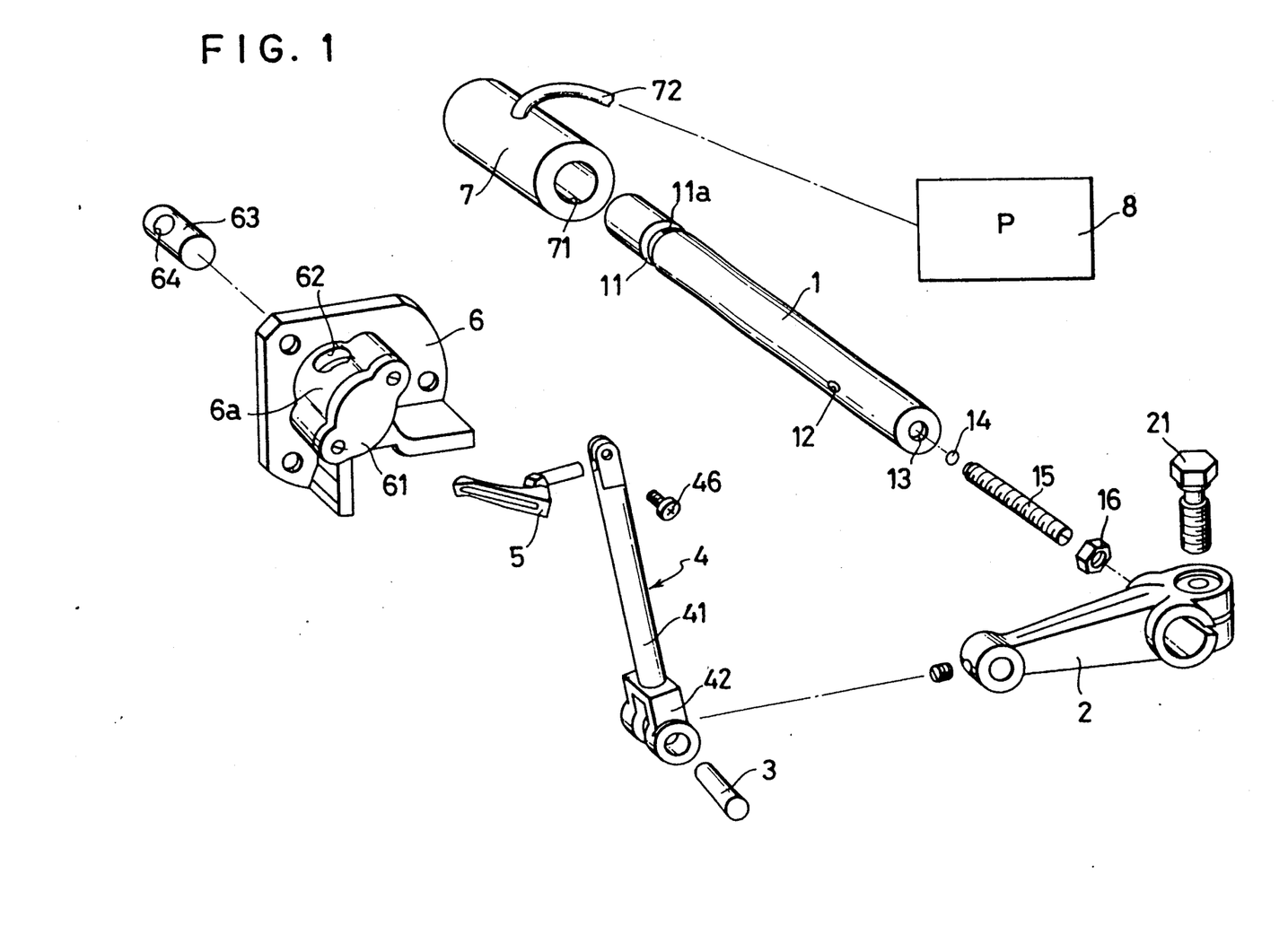
FIG. 1 is an exploded fragmental perspective view showing an upper looper mechanism of a sewing machine incorporating relatively sliding components according to a first embodiment of the invention.

The upper looper mechanism shown in FIG. 1 includes a swing shaft 1 swingable in synchronism with a vertical reciprocating motion of a sewing needle (not shown). The swing shaft 1 has one end portion rotatably supported by a bearing 7 fixed to a sewing machine frame (not shown). More specifically, the bearing 7 has an inner peripheral surface 71 into which the swing shaft 1 is inserted. Further, an annular groove 11 is formed at the shaft 1. The swing shaft 1 has another end portion fixedly coupled with a base end portion of a swing arm 2 by a bolt 21.

An upper looper support member 4, which is one of the sliding components, has a shaft portion 41 and a bifurcated portion provided at a lower end portion thereof. A ceramic material such as chromic oxide ($Cr_2O_3$) is sprayed over an outer peripheral surface of the shaft portion 41, and the bifurcated portion 42 is rotatably coupled to a tip end portion of the swing arm 2 by a pivot pin 3. An upper looper 5 is fitted to an upper end portion of the shaft portion 41 by a screw 5.

An upper looper guide support member 6 is fixed to the sewing machine frame. The upper looper guide support member 6 is formed with an elongated slot 62 at its protruded portion 6a, and an upper looper guide 63 formed with a guide bore 64 is rotatably disposed within the protruded portion 6a. The upper looper guide 63 is also a sliding component formed of a ceramic material such as a silicon carbide (SiC). Further, a lid 61 is provided to cover an open end of the protruded portion 6a. Therefore, the lid 61 and the sewing machine frame prevent the upper looper guide 63 from being displaced in its axial direction. The shaft portion 41 of the upper looper support member 4 extends through the elongated slot 62 and the guide bore 64, and is slidable with respect thereto.

When the swing shaft 1 is rotated about its axis in synchronism with the vertical reciprocating motion of the sewing needle, the upper looper support member 4 is swingingly moved together with the upper looper guide 63 by way of the swing arm 2. In this instance, the shaft portion 41 of the upper looper support member 4 is slidingly moved with respect to the guide bore 64 of the upper looper guide 63.

Next, a minute amount oil supply system used in this embodiment will be described with reference to FIGS. 1 and 2. As shown in FIG. 1, an oil supply pump 8 is connected to the bearing 7 through a tube 72. The above described annular groove 11 is provided at a position in confrontation with an open end of the tube 72 when the swing shaft 1 is inserted into the bearing 7. Further, a lubrication oil inlet port 11a is formed at the annular groove 11. The oil inlet port 11a is in fluid communication with an oil passage 18 (FIG. 2) extending in axial direction of the swing shaft 1. At another end portion of the swing shaft a female thread 13 is formed which extends in the axial direction of the shaft 1.

Figure 2:
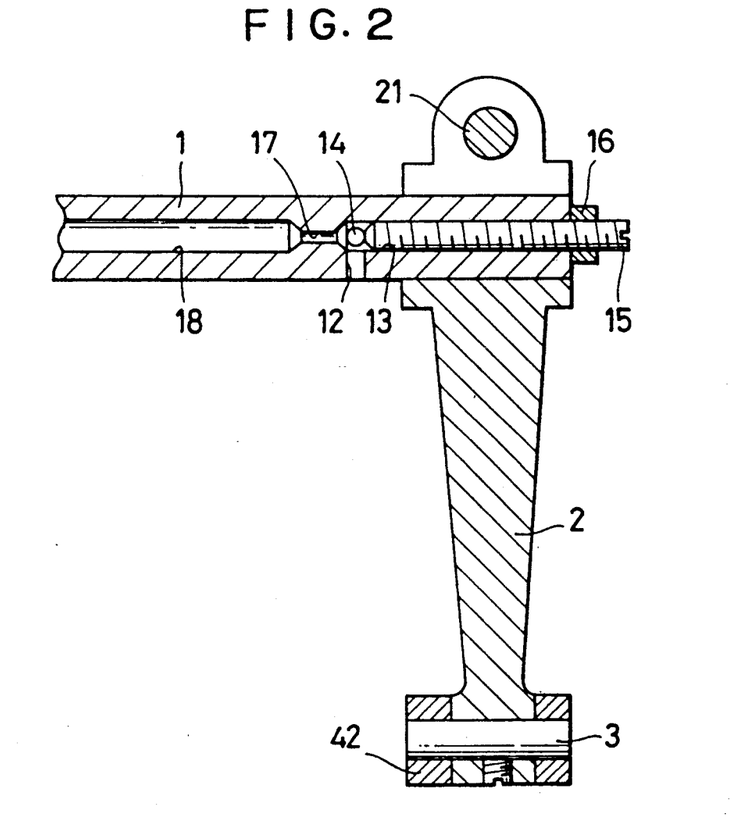
FIG. 2 is a cross-sectional view showing a minute amount oil supply system used in the upper looper mechanism according to the first embodiment.

As best shown in FIG. 2, the female thread 13 and the oil passage 18 are provided in alignment with each other, and these are communicated with each other by a communication hole 17 having relatively small inner diameter. Further, at an axially inner end portion of the female thread 13, a radial oil discharge port 12 is formed. The oil discharge port 12 is opened at an outer peripheral surface of the shaft 1 and at a position adjacent the swing arm 2. A threaded male screw 15 is threadingly engaged with the female thread 13. The position of the male screw 15 is controllable by a nut 16 positioned at an outer end portion of the thread of male screw 15. Further, at a position between the small diameter hole 17 and the inner end of the male screw 15 is a spherical piece 14 having a diameter larger than the inner diameter of the hole 17. The female thread 13 defines a control hole and the male screw 15 can be considered a control screw for controlling the amount of oil discharged from discharge port 12. Upon threading movement of male screw 15, the opening area of the communication hole 17 is controlled by the displacement of the spherical piece 14. The small diameter communication hole 17, the oil discharge port 12, the female thread 13 defined control hole and the male screw 15 constitute a minute amount of oil supply system.

The lubrication oil supplied from the pump 8 into the inner peripheral portion 71 of the bearing 7 through the tube 72 is first spread over a frictional, or sliding, portion between the outer peripheral surface at one end portion of the swing shaft 1 and the inner peripheral surface 71 of the bearing 7 for lubricating the rotating portion. Further, the oil is discharged to the outer peripheral surface at the opposite end of the swing shaft 1 through the oil inlet port 11a, the oil passage 18, the communication hole 17, the control hole defined by female threads 13 and the oil discharge port 12. In this case, only a limited amount of lubrication oil is discharged from the discharge port 12 since the spherical piece 14 restrains the oil flowing from the communication hole 17 into the discharge port 12. Further, if the nut 16 is unfastened and the length of the male screw 15 that is threaded into the control hole is controlled, the space for accommodating therein the spherical piece 14 can be changed thereby permitting the oil discharge amount to be controlled.

The discharged lubrication oil flows along the outer surfaces of the swing shaft 1 and the swing arm 2 to reach a sliding portion defined between the pivot pin 3 and the bifurcated portion 42 of the upper looper support member 4. Furthermore, the oil flows along the shaft portion 41 of the upper looper support member 4 and reaches two friction or sliding portions, one friction or sliding portion between the shaft portion 41 and the guide hole 64 of the upper looper guide 63 and the other friction or sliding portion between the upper looper guide 63 and the upper looper guide support member 6.

During operation of the sewing machine, the shaft portion 41 of the upper looper support member 4 exhibits high speed sliding motion relative to the guide hole 64 of the upper looper guide 63. In this case, since the sprayed layer formed of chromic oxide ceramic material is provided at the outer peripheral portion of the shaft portion 41, and since the upper looper guide 63 is formed of a silicon carbide ceramic material, sufficient wear resistance is provided at the friction, or sliding, portion or where shaft 41 passes through guide hole 64. Further, since lubrication oil is applied to the sliding portion, frictional wear and thermal seizure do not occur at the sliding portion even in cases of high speed, high load frictional motion. Furthermore, since a controlled minute amount of lubrication oil is supplied to the sliding portion, which amount is about 10 to 50% of the conventionally applied amount, no oil leakage occurs from the moving parts and, as a result, the fabric and/or a thread is protected from contamination with the lubrication oil.

In this embodiment, several modifications are possible. For example, both the sliding, or friction, portions of the upper looper support member 4 and the upper looper guide 63 that are in frictional contact are formed of the ceramic material. However, one of the components, such as the shaft portion 41 of the upper looper support member 4, could also be formed of a high hardness chromium plating and the other of the components having frictional contact, such as the upper looper guide 63 can be formed of the silicon carbide ceramic material. Thus, the relevant effect is attained by forming one of the frictional components from a ceramic material.

In the illustrated embodiment, the ceramic materials are silicon carbide (SiC) and chromic oxide ($Cr_2O_3$). However, also available are other kinds of ceramic materials such as silicon nitride ($Si_3N_4$), zirconia ($ZrO_2$) and aluminum oxide ($Al_2O_3$).

The above described frictional arrangement is different from the conventional upper looper mechanism in which the upper looper supporting member and the upper looper guide have been formed of a metal such as a carbon steel or, in the alternative, to provide sustained operations under high speed, high load friction producing conditions and to provide wear resistance, the friction surface, or surfaces, is plated with chromium or nickel because of their high hardness. Further, in the conventional arrangement, a large amount of lubrication oil is applied to the friction, or sliding, portions in order to avoid excessive heat generation, frictional wear and seizure.

Contrary to the conventional arrangement, according to the above described embodiment, sufficient friction resistant performance is obtainable using a ceramic material for at least one of the components in frictional contact with the controlled application of a small amount of lubrication oil to the friction zone.

A second embodiment according to the invention is shown in FIGS. 3 thru 7. The second embodiment pertains to a shuttle body assembly, where a high speed, high load sliding motion is performed, and to an oiling system for the shuttle body assembly for use in an industrial sewing machine.

Figure 3:
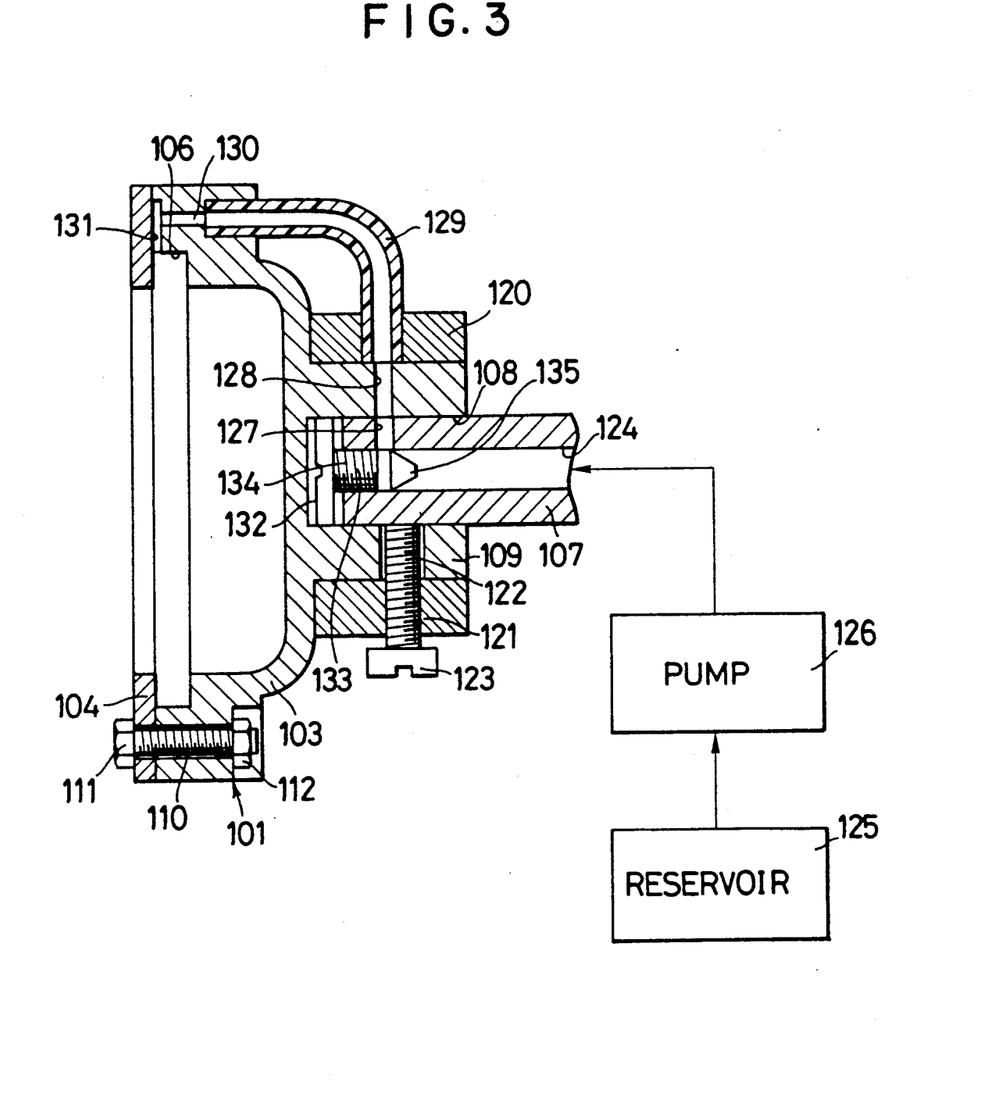
FIG. 3 is a cross-sectional view showing partially in block form a shuttle body assembly and a minute amount oil supply system in a sewing machine incorporating the relatively sliding components according to a second embodiment of this invention.
Figure 4:
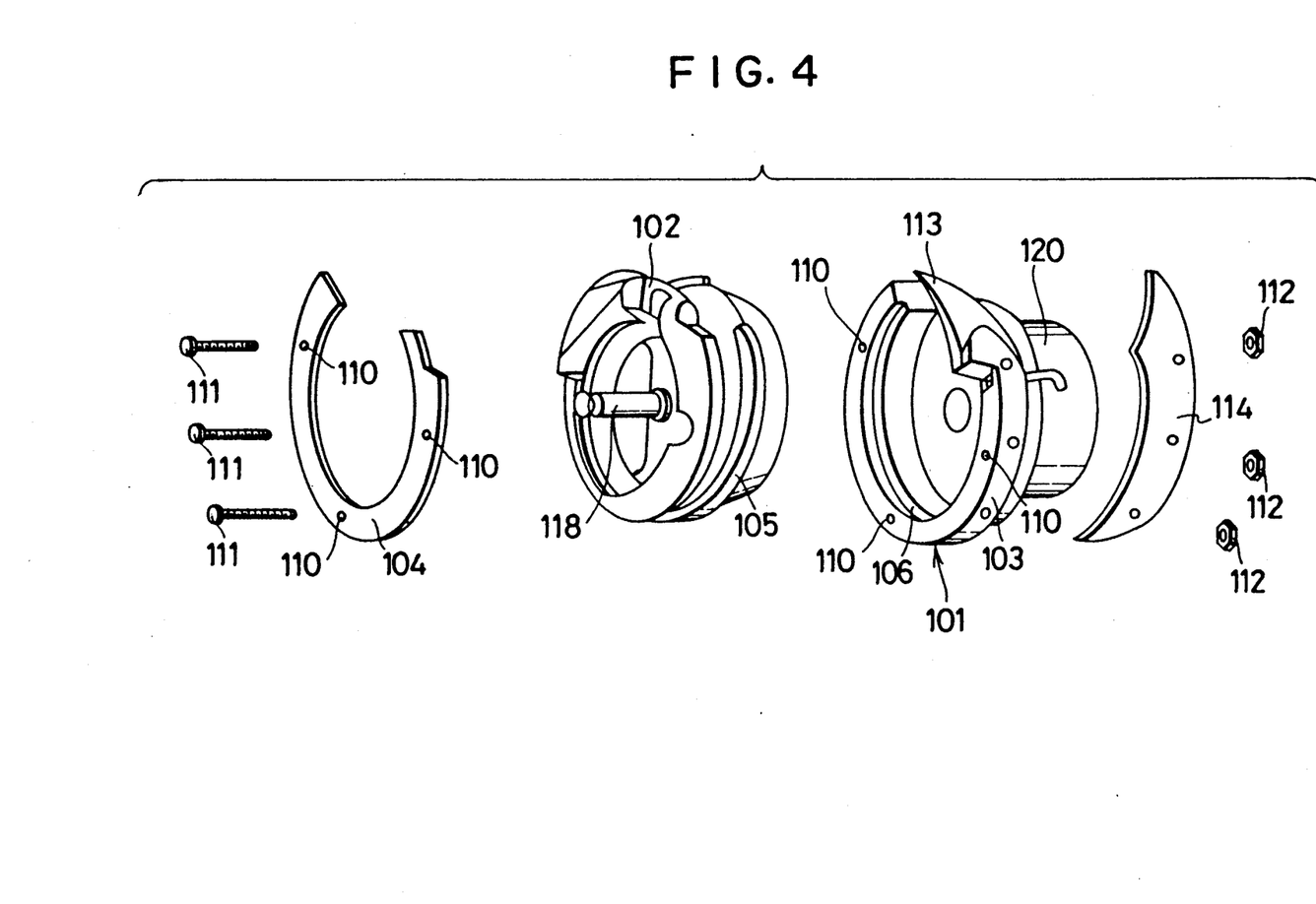
FIG. 4 is an exploded fragmental perspective view showing the shuttle body assembly according to the embodiment of FIG. 3.

The shuttle body assembly includes an external shuttle race body 101 and an internal shuttle body 102. The shuttle race body 101 includes a main portion 103 and a shuttle body holder 104, each being molded of silicon carbide (SiC) by injection molding. The main portion 103 has a stepped portion defining an annular groove 106 that is also defined by an inner surface of the shuttle body holder 104. The shuttle body 102 has a sliding rail 105 which his slidably fitted in the groove 106, so that the shuttle body 102 is rotatably supported in the shuttle race body 101. The main portion 103 also includes a boss 109 having a central hole 108 defined therein. A drive shaft 107 for driving the shuttle body assembly is fitted in the central hole 108. Each of the main portion 103 and the shuttle body holder 104 has three through holes 110. The main portion 103 and the shuttle body 104 are separably fastened to each other by bolts 111 inserted through the holes 110 and nuts 112 threaded over the bolts 111.

Figure 5:
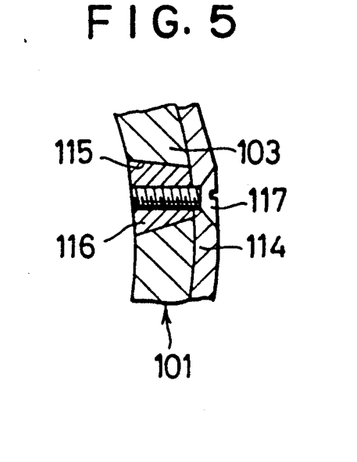
FIG. 5 is a detailed fragmentary cross-sectional view showing a portion where a loop spreading member is fixed in the embodiment of FIG. 3.

A loop spreading member 114 in the form of a metal plate is fixed to an extends around the main portion 103 near a pointed member 113. The loop spreading member 114 is secured to the main portion 103 at a plurality of locations (three locations in the illustrated embodiment). More specifically, as shown in FIG. 5, in each of such locations, a countersunk head screw 117 is threaded through the loop spreading member 114 into an internally threaded tapered metal member 116 which is inserted into a corresponding tapered hole 115 formed in the main portion 103.

Figure 6:
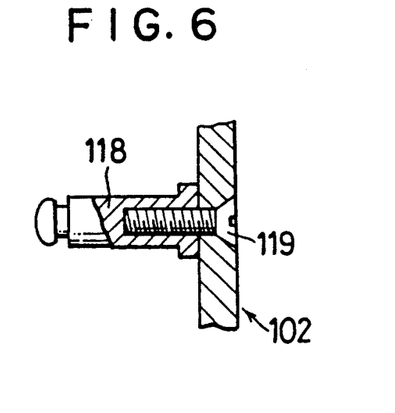
FIG. 6 is a detailed cross-sectional view showing a portion where a bobbin shaft is fixed in the embodiment of FIG. 3.
Figure 7:
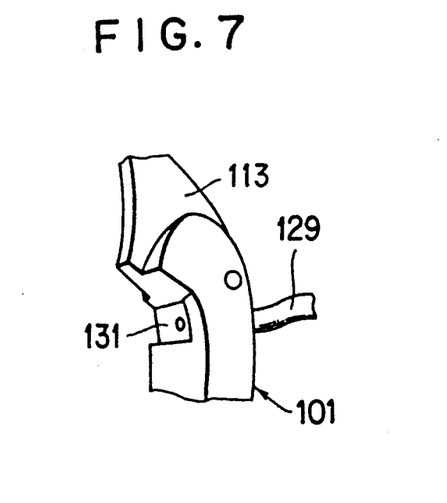
FIG. 7 is an enlarged fragmentary perspective view showing a portion where oil is supplied to sliding portions of the shuttle body assembly in the embodiment of FIG. 3.

Similar to the main portion 103 and the shuttle body holder 104, the shuttle body 102 is also molded as an unitary structure of silicon carbide (SiC) by injection molding. As shown in FIG. 6, the shuttle body 102 has a separate bobbin support shaft 118 made of metal which has an internally threaded hole defined centrally therein. The bobbin support shaft 118 is fixed to the shuttle body 102 by a countersunk head screw 119 which is threaded through the bottom of the shuttle body 2 into the internally threaded hole in the bobbin support shaft 118. When the shuttle body assembly is in use, the shuttle body 102 is prevented from rotating with the shuttle race body 101 by a shuttle body stopper, as is known in the art.

As shown in FIG. 3, a sleeve 120 formed of a metal is fitted over the boss 109, and secured thereto by shrink-fitting treatment or adhesive bonding. The sleeve 120 has an internal threaded hole 121 extending in radial direction thereof. A screw 123 is threaded with the threaded hole 121 and extends through a small hole 122 defined in the boss 109. The screw 123 thus threaded has a tip end held against the outer peripheral surface of the drive shaft 107 which drives the shuttle body assembly, thereby fixing the drive shaft 107 and the shuttle race body 101 to each other.

Next, a system for supplying lubricating oil to the shuttle race assembly will be described.

The drive shaft 107 is formed with a central hole 124 extending in axial direction thereof. Further, radial holes 128 and 127 are formed in the boss 109 and the drive shaft 107, respectively, and in alignment with each other. The sleeve 120 is also formed with a radial hole in alignment with the radial holes 128 and 127 and one end of a flexible tube 129 is inserted in the hole of the sleeve 120. A flanged portion of the main portion 103 is formed with an axial bore to which the other end of the tube 129 is connected. The tube 129 has its opposite ends inserted into holes of the main portion 103 and the sleeve 120, these holes having inner diameters larger than the diameters of the radial holes 128, 127 and the small axial bore 130. With the structure, the ends of the tube 129 are therefore positioned in place by the steps which are defined between, these holes of different diameters. The tube 129 is in fluid communication with the small axial bore 130 which is in fluid communication with a radial hole 131 provided between parting faces of the main portion 103 and the shuttle body holder 104. The radial hole 131 is opened to the groove 106 defined by the stepped portion of the main portion 103 and the inner surface of the shuttle body holder 104.

As shown in FIG. 3, the central hole 124 is connected to a lubricating oil pump 126 connected to a lubricating oil reservoir 125. The lubricating oil supplied to the central hole 124 from the reservoir 125 is then introduced into a space between the sliding rail 105 of the shuttle body 102 and the surface of the groove 106 through the radial holes 127, 128, the flexible tube 129, the small hole 130 and radial hole 131.

A regulating valve 132 for regulating the amount of supplied lubricating oil in small quantities is threaded into an end of the central hole 124 in the drive shaft 107. The regulating valve 132 includes an externally threaded portion 134 threaded into an internally threaded portion 133 of the central hole 124 and a tapered portion 135 on the tip end of the externally threaded portion 134. The amount of supplied lubricating oil can be regulated when the tapered portion 135 is moved to increase or reduce the opening area of the radial hole 127.

With the above arrangement, the amount of lubricating oil supplied between the sliding rail 105 of the shuttle body 102 and the surface of the groove 106 of the main portion 103 of the shuttle race body 101 can be freely controlled by the regulating valve 132. When the amount of the supplied lubricating oil is to be controlled, the screw 123 must be loosened, and the shuttle body assembly must be removed from the drive shaft 107.

Further, the amount of supplied lubricating oil can also be regulated if the tube 129 is replaced with a tube having an inner diameter different from the old tube 129 or in case where tubes having different diameters are co-used.

According to the second embodiment, several modifications are possible. For example, in the illustrated embodiment, the shuttle race body 101 and the shuttle body 102 are integrally molded products where all solid parts of the shuttle race body 101 and the shuttle body 102 are formed of the ceramic material. However, at least one of the sliding portions can be formed of the ceramic material. That is, only one or both of the sliding rail 105 of the shuttle body 102 and the surface portion defined by the groove 106 of the main portion 103 of the shuttle race body 101 may be formed of a ceramic material. Alternatively, only one of the shuttle race body 101 and the shuttle body 102 may be molded as a unitary structure with a ceramic material.

Further, the ceramic material may be selected from the group consisting of silicon carbide (SiC), silicon nitride ($Si_3N_4$), zirconia ($ZrO_2$), and chromic oxide ($Cr_2O_3$).

Furthermore, one of the shuttle race body and the shuttle body may be molded as a unitary structure of a ceramic material which is mainly composed of silicon carbide (SiC), and the remaining one of the shuttle body and the shuttle race body may be molded as a unitary structure of a ceramic material which is mainly composed of chromic oxide ($Cr_2O_3$).

Alternatively, both the shuttle race body and the shuttle body may be molded as unitary structures of a ceramic material which is mainly composed of silicon carbide (SiC).

Likewise, both the shuttle race body and the shuttle body may be molded as unitary structures of a ceramic material which is mainly composed of chromic oxide ($Cr_2O_3$).

Moreover, another alternative is for one of the shuttle race body and the shuttle body to be molded as a unitary structure of a ceramic material which is mainly composed of silicon carbide (SiC) or chromic oxide ($Cr_2O_3$), and the remaining one of the shuttle body and the shuttle race body may be made of metal and plated with hard chromium (Cr).

With the arrangement in the second embodiment, wear and seizure of the sliding portions of the shuttle body assembly are prevented. Further, since the sliding portions are supplied with only a small amount of lubrication oil, fabric pieces to be sewn and sewing threads are protected from smear and damage. Therefore, the embodiment provides advantages over a conventional shuttle body assemblies made of a metal such as carbon steel, as the conventional shuttle body assemblies must be case-hardened, and plated with hard chromium or otherwise surface-treated, so that they are resistant to wear.

Figure 8:
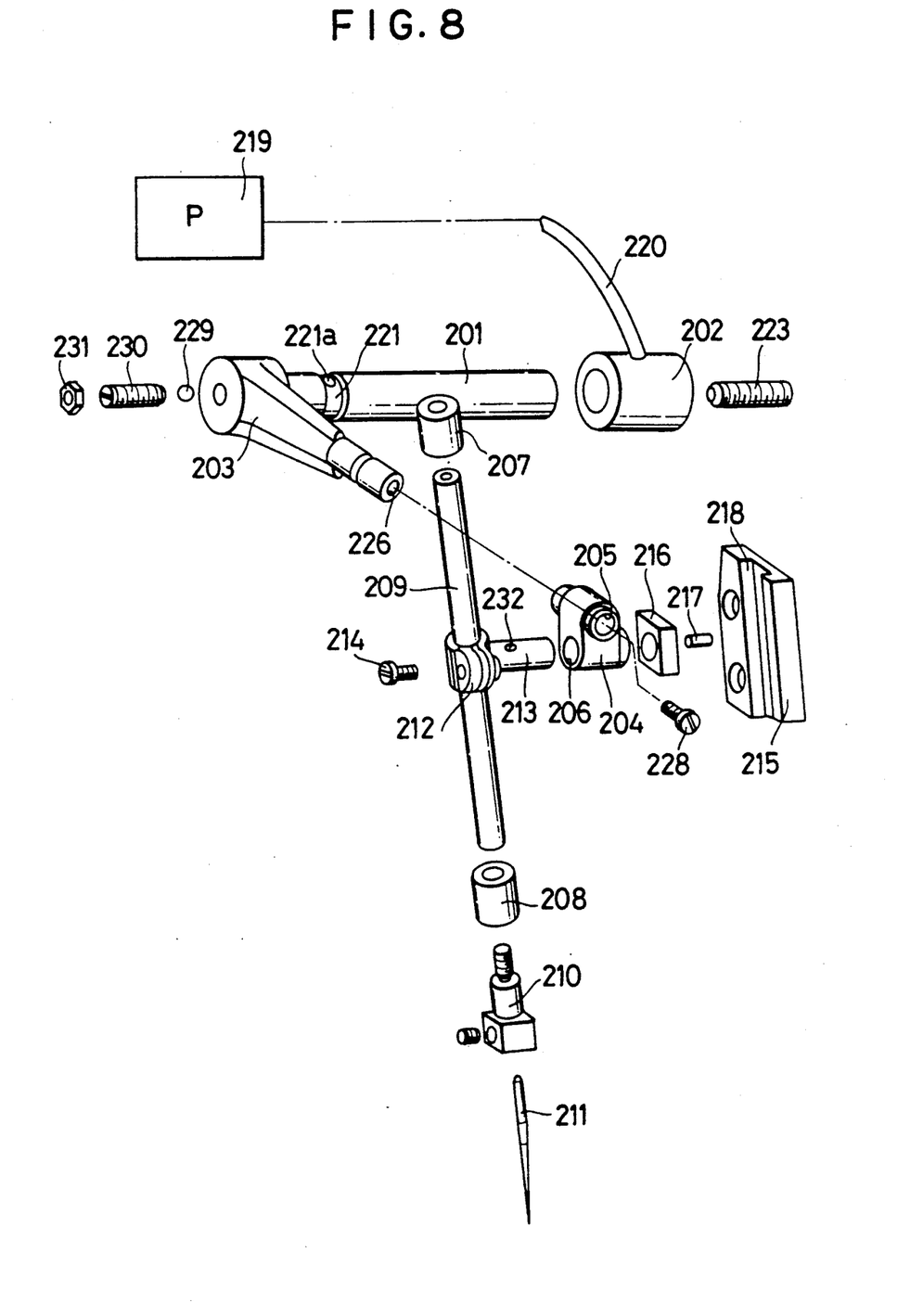
FIG. 8 is an exploded fragmental perspective view showing a needle bar mechanism in a sewing machine incorporating the relatively sliding components according to a third embodiment of this invention.
Figure 9:
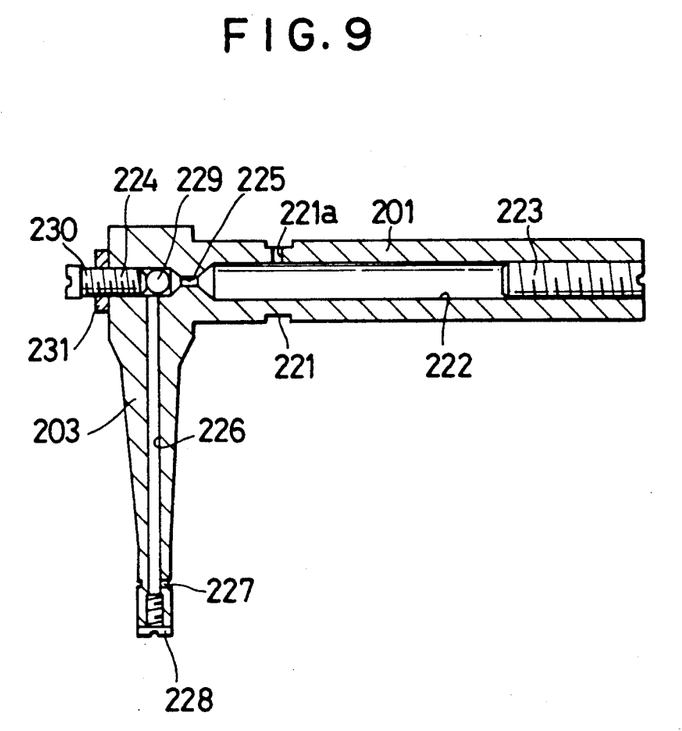
FIG. 9 is a cross-sectional view showing a minute amount oil supply system used in the needle bar mechanism according to the embodiment of FIG. 8.

A third embodiment according to this invention will next be described with reference to FIGS. 8 and 9, in which a needle bar mechanism in a sewing machine is delineated, where high speed, high load frictional motion occurs.

A rotation shaft 201 has one end portion rotatably supported by a bearing 202 fixed to a sewing machine frame. The rotation shaft 201 is operated upon operation of the sewing machine. The rotation shaft 201 has its other end portion integrally fixed with a swing arm 203 which extends perpendicular to the axial direction of the shaft 201. A tip end portion of the swing arm 203 is slidingly inserted into a first through hole 205 formed in a needle bar joint 204 which is formed with a second through hole 206. The first and second through holes 205 and 206 are in fluid communication with each other.

A pair of upper and lower needle bar bushings 207 and 208 are fixed to the sewing machine frame for guiding vertical sliding movement of a needle bar 209. As shown in FIG. 8, the needle bar 209 is inserted through the needle bar bushings 207, 208. A needle 211 is fixed to a lower end portion of the needle bar 209 through a needle clamp body 210. Further, a needle bar connecting stud 212 is fixed to an intermediate portion of the needle bar 209 by way of a screw 214. The connecting stud 212 has a stem portion 213 which is inserted into the second through hole 206 of the needle bar joint 204. The stem portion 213 is also inserted into a rectangular piece 216 which is slidingly movable relative to a guide groove 218 formed in a needle bar guide 215 fixed to the sewing machine frame. The stem portion 213 of the needle bar connecting stud 212 is formed with an axial in which a rod like felt member 217 is inserted in order to receive therein lubrication oil. Further, the stem portion 213 is also formed with a radial communication hole 232 in communication with the felt member 217.

In the above described needle bar mechanism, sprayed layers formed of chromic oxide ceramic materials ($Cr_2O_3$) are provided over the surfaces of the tip end portion of the swing arm 203, the needle bar 209, the stem portion 213 of the needle bar connecting stud 212, and the needle bar guide 215. Further, the needle bar joint 204, the needle bar bushings 207, 208 and the rectangular piece 216 are formed of silicon carbide ceramic material (SiC).

Upon operation of the sewing machine, the rotation shaft 201 rotates about its axis and the swing arm 203 is swingably moved, so that the needle bar 209 is vertically reciprocally moved through the needle bar joint 204 and the needle bar connecting stud 212. This vertically reciprocating motion of the needle bar 209 is guided by the rectangular piece 216 and the needle bar guide 215.

Next, a lubrication system will be described with reference to FIGS. 8 and 9. The bearing 202 is connected to a pump 219 through a tube 220 for supplying lubricating oil to various sliding portions described above. The rotation shaft 201 is formed with an oil passage 222 extending in axial direction thereof. One end of oil passage 222 is plugged by a screw 223. An annular groove 221 is formed on the rotation shaft 201 at a position in confrontation with an open end of the tube 220 and a radial oil inlet port 221a is formed in the annular groove 221 for introducing oil from the pump 219 to the oil passage 222.

A base portion of the swing arm 203 is formed with an internally threaded control hole 224 extending coaxial with the oil passage 222. The control hole 224 is in fluid communication with the oil passage 222 by a communication hole 225 having a small inner diameter. Provided within the control hole 224 is a spherical piece 229 having a diameter larger than the inner diameters of the communication hole 225 and an oil discharge passage 226. A control screw 230 is threadingly engageable with the control hole 224 and a threading position of the control screw 230 is fixed by a nut 231.

The oil discharge passage 226 is formed in the swing arm 203. The discharge passage 226 extends in the longitudinal direction of the swing arm 203, having one end in fluid communication with the control hole 224 and the other end provided with a screw 228 for plugging the open end. A radial discharge port 227 in communication with the discharge passage 226 is formed at a tip end portion of the swing arm 203. The discharge port 227 is opened at a side surface of the tip end portion of the swing arm 203. The communication hole 225, the control hole 224, the spherical piece 229, the control screw 230, the oil discharge passage 226 and the oil discharge port 227 constitute a minute amount oil supply system.

The oil supplied from the pump 219 into the bearing 202 through the tube 220 lubricates the friction zone between the rotation shaft 201 and the bearing 202. It is discharged from oil discharge port 227 by way of the oil inlet port 221a, the oil passage 222, the communication hole 225, the control hole 224, and the oil discharge passage 226. In this oil discharge arrangement, a small controlled amount of oil flows from the discharge port 227 as the spherical piece 229 controls the opening area of the communication hole 225 by means of the controlled threading of the screw 230 into the small opening area.

The oil discharged from the discharge port 227 reaches the friction zone between the tip end portion of the swing arm 203 and the first through hole 205 and is introduced into the second through hole 206 for lubricating still another friction zone defined by the stem portion 213 of the needle bar connecting stud 212, the second through hole 206 and the rectangular piece 216. Further, the oil delivered to the stem portion 213 is passed to the felt member 217 through the radial hole 232 so that the oil lubricates still another friction zone between the rectangular piece 216 and the needle bar guide groove 218. Additional lubrication oil flows along an outer surface of the stem portion 213 and, from there, is supplied to the outer surface of the needle bar 209 for lubricating sliding portions defined between the needle bar 209 and the needle bar bushings 207, 208.

During sewing, the needle bar 209 slidably moves relative to the needle bar bushings 207, 208 at high speed. In this case, the sliding portions are protected from frictional wear and seizure since the portions in contact are provided with the layers of ceramic materials such as chromic oxide (needle bar) and silicon carbide (needle bar bushings). Further, since the sliding portions in frictional contact are supplied with a controlled amount of oil, which is about 10 to 50% of the conventionally applied amount, no scattering nor leakage of oil from the sliding portions occurs. As a result, the fabric piece and/or a sewing thread are protected against contamination with the oil.

In this embodiment, several modifications are possible similar to the foregoing embodiments. For example, the sliding portion of the needle bar 209 may be provided with chromium plating instead of the ceramic spraying and the needle bar bushings 207, 208 may be entirely formed of silicon carbide ceramic material. Even if only one of the sliding portions is formed of a ceramic material, the relevant effect would result. Further, instead of using silicon carbide and chromic oxide, other ceramic materials such as silicon nitride ($Si_3N_4$), zirconia ($ZrO_2$) and aluminum oxide ($Al_2O_3$) may be used.

Figure 10:
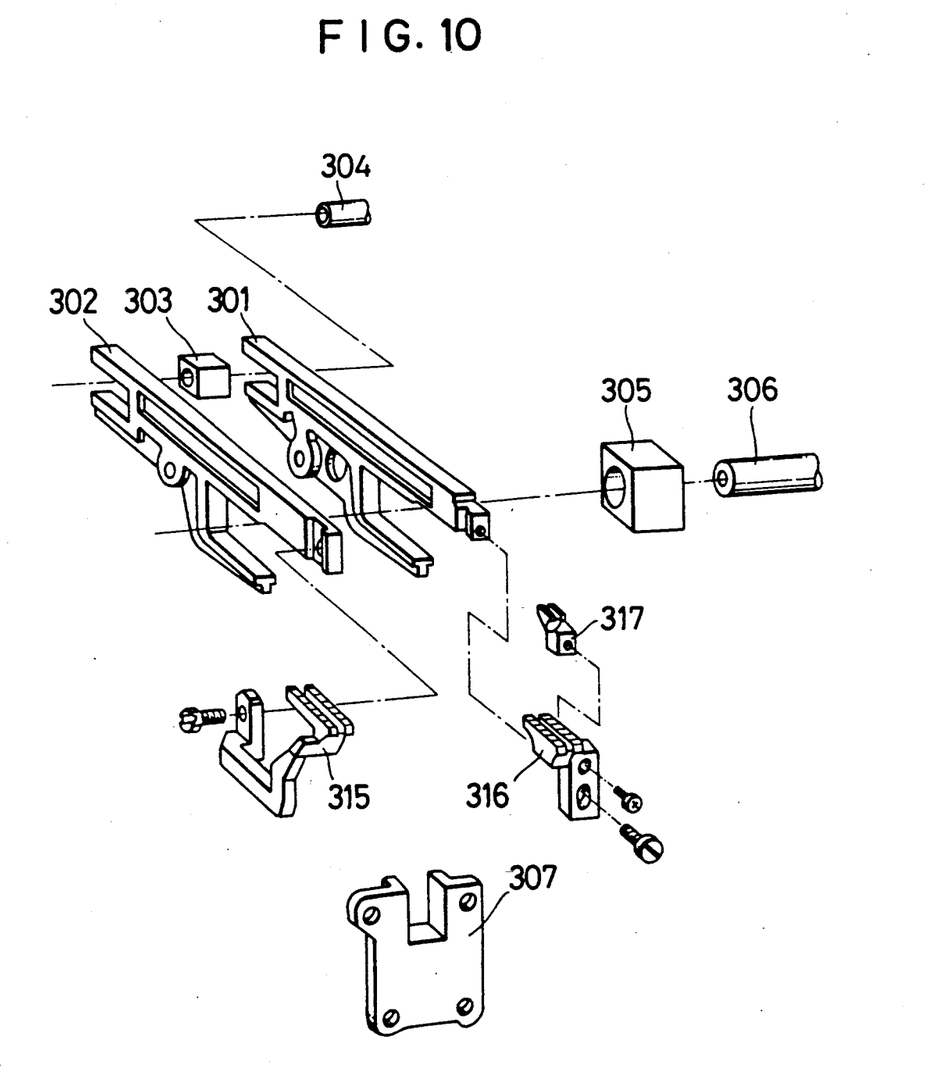
FIG. 10 is an exploded fragmental perspective view showing a feed mechanism in a sewing machine incorporating relatively sliding components according to a fourth embodiment of this invention.
Figure 11:
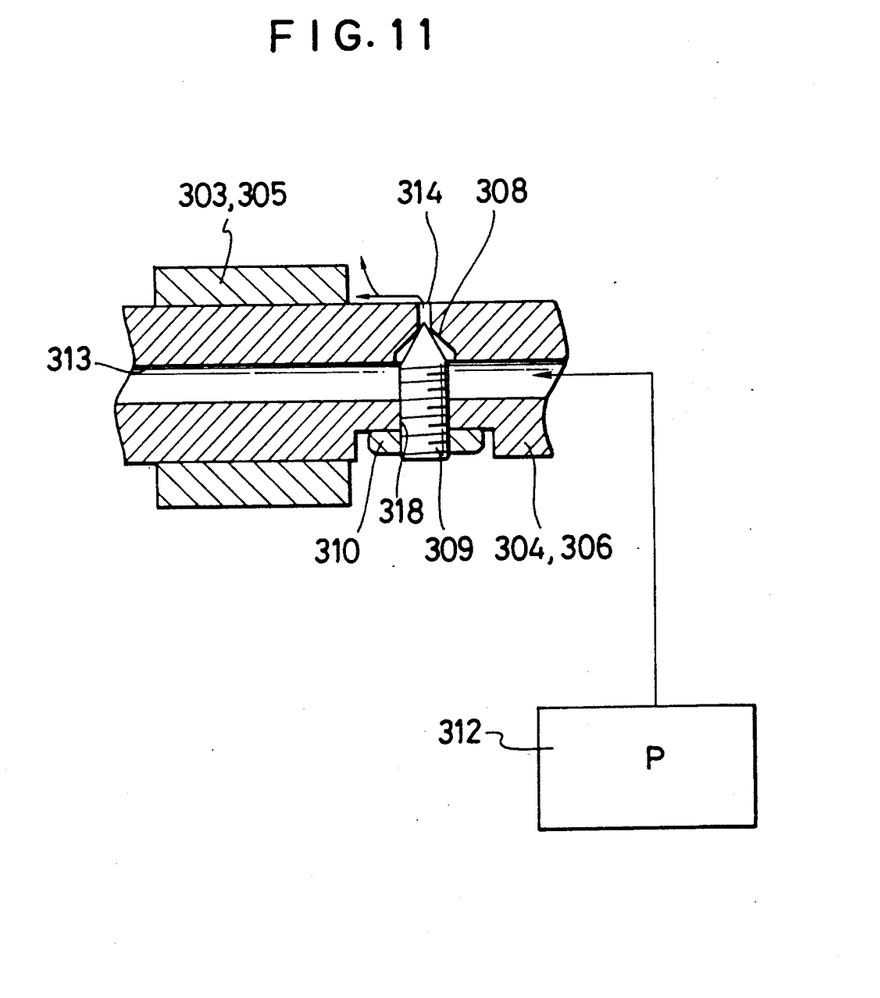
FIG. 11 is a cross-sectional view showing a minute amount oil supply system used in the feed mechanism according to the embodiment of FIG. 10.

A fourth embodiment according to this invention will next be described, with reference to FIGS. 10 and 11, in which a fabric feed mechanism for use in an overlocking type sewing machine for industrial uses is shown.

A main feed dog 316 and an auxiliary feed dog 317 are connected to the front end of a main feed bar 301 and a differential feed dog 315 is connected to the front end of a differential feed bar 302. Intermediate portions and rear portions of the main and differential feed bars 301 and 302 are slidably supported by a front vertical feed forked connection slide block 305 and a rear connection slide block 303, so that the feed bars 301 and 302 are slidably movable in a fabric piece feeding direction. An eccentric shaft 306, which extends in a direction perpendicular to the fabric piece feeding direction, is inserted into the front slide block 305. The eccentric shaft 306 rotates during sewing. Further, a support shaft 304, fixed to the sewing machine frame and extending in a direction parallel with the eccentric shaft 306, is inserted into the rear slide block 303. A feed bar guide 307 is fixedly secured to the sewing machine frame for slideably guiding travel of the front portions of the feed bars 301 and 302 in the fabric piece feeding direction and in the vertical direction. The feed bars 301, 302 are coupled, through conventional main and differential feed links, to a conventional rotation shaft which is rotatable upon operation of the sewing operation.

A sprayed layer formed of chromic oxide ceramic material is provided over surfaces of the main feed bar 301, the differential feed bar 302, the feed bar guide 307, the eccentric shaft 306 and the support shaft 304. Further, the front slide block 305 and the rear slide block 303 are entirely formed of silicon carbide ceramic material.

During sewing, the eccentric shaft 306 is rotated, so that the front slide block 305 is moved along its circular locus. The vertical component of the circular motion is transmitted to the feed bars 301 and 302 and, therefore, these feed bars 301, 302 are moved in a vertical direction with respect to the support shaft 304. Further, when the rotation shaft (not shown) is rotated about its axis during sewing, the main feed bar 301 and the differential feed bar 302 are horizontally moved (in the fabric piece feeding direction) by way of the main feed link and the differential feed link, respectively. Accordingly, the feed bars 301 and 302 are slidingly moved with respect to the front and rear slide blocks 305, 303 and to the feed bar guide 307 while moving in both the vertical and horizontal directions. Consequently, the feed dogs 315, 316 and 317 are moved along their moving loci which have an oval configuration.

A minute oil amount supply system used in this embodiment will next be described. The support shaft 304 and the eccentric shaft 306 are formed with oil passages 313 extending in axial direction thereof to which a pump 312 is connected for supplying lubrication oil to the sliding portions described above. Internally threaded control holes 318 are formed in the support shaft 304 and the eccentric shaft 306. The control holes 318 extend in a direction perpendicular to the axial direction of the shafts and are in fluid communication with the oil passages 313. Further, oil discharge passages or ports 314 extend in a radial direction of the shafts 306, 304 and in alignment with the control holes 318 with which they are in fluid communication through tapered bores 308. Control screws 309 are threadingly engaged with the control holes 318 and are fixed by nuts 310. The control screws 309 have conical end portions whose apices are disposed concentrically with the oil discharge ports 314. The tapered portion 308, the control screw 309, the discharge port 314 and the control hole 318 constitute a minute amount oil supplying system.

The lubrication oil supplied from the pump 312 into the oil passages 313 is discharged to outer peripheral surfaces of the support shaft 304 and the eccentric shaft 306 by way of the tapered portions 308 and the discharge ports 314. In this case, a minute amount of oil is discharged from the discharge ports 314 because the conical portion of the control screw 309 restrains free oil discharge from the oil passages 313 to the discharge ports 314. Further, by controlling the threading amount of the control screw 309 after releasing the nut 318, the gap length between the conical bore 308 and the conical end portion of the control screw 309 is changed to thereby control the oil discharge amount from the discharge port 314.

The lubricating oil discharged from the discharge port 314 of the support shaft 304 is supplied to a friction zone, or sliding portion, between the support shaft 304 and the rear slide block 303 for lubricating the friction zone. Further, the oil reaches another friction, or sliding, portion between the rear slide block 303 and the feed bars 301, 302 thereby lubricating those portions. In the same manner, the oil discharged from the discharge port 314 of the eccentric shaft 306 is supplied to the friction, or sliding, portion between the eccentric shaft 306 and the front slide block 305 and to another friction, or sliding, portion between the front slide block 305 and the feed bars 301, 302. The oil reaching the main feed bars 301, 302 is also applied to a friction, or sliding, portion between the confronting feed bars 301 and 302.

During sewing, the main feed bar 301, the differential feed bar 302 and the front and rear slide blocks 305, 303 are, relatively frictionally moved at high speed. However, neither excessive wearing nor seizure occurs mainly because of the formation of a sprayed layer of the chromic oxide ceramic material formed over the surfaces of the feed bars 301 and 302, and because of the use of the silicon carbide ceramic material for the other members of the operating mechanism, and the application of lubrication oil to these sliding portions or surfaces in frictional contact. In this case, the oil application amount is about 10 to 50% of the conventionally applied amount and, therefore, no oil scattering or leakage occurs. Consequently, the fabric piece and/or thread do not become contaminated by oil.

In this embodiment, the conventional packing can be dispensed with. In case of a conventional fabric feeding mechanism, a packing is provided at the feed bar guide for preventing oil leakage through the feed bars. In the present embodiment, the packing is not required since only a small amount of lubrication oil is applied to the sliding portions. Further, because in the present embodiment a chromic oxide ceramic material is sprayed over a surface of the feed bar guide 307, the friction, or sliding, portions defined between the feed bars 301, 302 and the feed bar guide 307 provide sufficient wear resistivity and durability.

In the fourth embodiment, several modifications are possible. For example, in the illustrated embodiment, the friction, or sliding, portions of the feed bars 301, 302 and the slide blocks 305, 303 are formed of ceramic materials. However, only one of the components or portions need be formed of the ceramic material and the other component in frictional contact may be formed of a metal. For example, the slide blocks 303, 305 may be formed of silicon carbide ceramic and the feed bars 301, 302 are subjected to surface treatment such as carburizing treatment. Further, silicon nitride ($Si_3N_4$), zircon ($ZrO_2$) and aluminum oxide ($Al_2O_3$) may be used instead of silicon carbide and chromic oxide.

As described above, according to the present invention, at least one of the sliding portions is formed of a ceramic material, and the minute oil amount supplying system is provided for supplying the lubrication oil to the friction, or sliding, portions. Therefore, the resultant friction, or sliding, portions have high wear resistance and durability and thermal seizures are prevented even under high speed, high load sliding conditions. Moreover, oil leakage is avoided thereby protecting the fabric piece and thread against contamination with the oil.

While the invention has been described in detail and with reference to specific embodiments thereof, it would be apparent to those skilled in the art that various changes and modifications can be made therein without departing from the spirit and scope of the invention.

What is claimed is:

1. A relatively sliding arrangement comprising:
   a sliding member having a first sliding portion;
   an opponent sliding member having a second sliding portion, the first and the second sliding portions being in relative sliding contact with each other, and at least one of the first and second sliding portions being formed of a ceramic material having high hardness and high wear resistance; and
   means for supplying a minute amount of a lubrication oil to the sliding portions, wherein said sliding member and said opponent sliding member comprise a pair of sewing machine components selected from the group of paired components consisting of an upper looper support member and an upper looper guide means, a shuttle race body and a shuttle body, a needle bar and a needle bar guide means, and feed bars and feed bars supporting means.

2. The relatively sliding arrangement as claimed in claim 1, wherein the ceramic material is selected from the group consisting of silicon carbide, chromic oxide, silicon nitride, zirconia and aluminum.

3. The relatively sliding arrangement as claimed in claim 1, wherein the means for supplying comprises a lubrication oil supply pump, and a regulation means for regulating the lubrication oil amount to be supplied to the relatively sliding portions.

4. A relatively sliding arrangement comprising:
at least one sliding member having a first sliding portion;
at least one opponent sliding member having a second sliding portion, the first and the second sliding portions being in relative sliding contact with each other and at least one of the first and second sliding portions being formed of a ceramic material having high hardness and high wear resistance; and
means for supplying a minute amount of lubrication oil to the sliding portions, wherein the means for supplying comprises a lubrication oil supply pump and a regulation means for regulating the lubrication oil amount to be supplied to the relatively sliding portions; the sliding member comprises an upper looper support member (4) to which an upper looper (5) is attached; and the opponent sliding member comprises an upper looper guide means for slidably guiding a movement of the upper looper support member; the upper looper support member, the upper looper and an upper looper guide being components of an upper looper mechanism of a sewing machine.

5. The relatively sliding arrangement as claimed in claim 4, wherein the upper looper mechanism comprises;
the upper looper (5);
the upper looper support member (4) comprising a shaft portion (41) having an outer peripheral surface, a one end portion and another end portion, and a bifurcated portion (42) fixed to the one end portion of the shaft portion (41), the upper looper (5) being supported to the another end portion of the shaft portion (41); and
the upper looper guide means comprising an upper looper guide support member (6) formed with a slot (62), and an upper looper guide (63) formed with a guide bore (64) and rotatably supported on the upper looper guide support member (6), the shaft portion (41) slidably extending through the slot (62) and the guide bore (64),
the first sliding member comprising the shaft portion (41) of the upper looper support member (4) and the first sliding portion comprising the outer peripheral surface of the shaft portion (41);
the opponent sliding member comprising the upper looper guide (63) and the second sliding portion comprising the guide bore (64).

6. The relative sliding arrangement as claimed in claim 5, wherein the shaft portion (41) is provided with a sprayed layer formed of chromic oxide, and the upper looper guide (63) is entirely formed of silicon carbide.

7. The relatively sliding arrangement as claimed in claim 5, wherein the upper looper mechanism further comprises:

a rotation shaft (1) having a first end portion and a second end portion, the first end portion being formed with an annular groove (11) and a radial oil inlet port (11a), the rotation shaft (1) being formed with an oil passage (18) extending in an axial direction thereof and in fluid communication with the radial oil inlet port (11a), and the second end portion of the rotation shaft (1) being formed with a control female thread (13) in fluid communication with the oil passage (18) by a communication hole (17), the second end portion of the rotation shaft (1) being also formed with a radial oil discharge port (12) in fluid communication with the control female thread (13);
a bearing (7) for rotatably supporting the first end portion of the rotating shaft (1), the bearing (7) being in fluid communication with the oil supply pump, and the annular groove (11) being in fluid communication with the bearing (7);
swing arm (2) having a first end coupled to the second end portion of the rotation shaft (1) and having a second end pivotally connected to the bifurcated portion (42), the oil discharge port (12) being opened at a portion adjacent the first end of the swing arm (2),
wherein the oil regulation means comprises the oil inlet port (11a), the oil passage (18), the communication passage (17), the control female thread (13), a spherical piece (14) positioned within the control female thread (13) for controllably opening the communication passage (17) and a male screw (15) threadingly engaged with the control female thread (13).

8. A relatively sliding arrangement comprising:
at least one sliding member having a first sliding portion;
at least one opponent sliding member having a second sliding portion, the first and the second sliding portions being in relative sliding contact with each other and at least one of the first and second sliding portions being formed of a ceramic material having high hardness and high wear resistance; and
means for supplying a minute amount of lubrication oil to the sliding portions, wherein the means for supplying comprises a lubrication oil supply pump and a regulation means for regulating the lubrication oil amount to be supplied to the relatively sliding portions; the sliding member comprises a shuttle race body (101); and the sliding member comprises a shuttle body (102) disposed within the shuttle race body (101), the shuttle race body and the shuttle body being components of a shuttle body assembly of a sewing machine.

9. The relatively sliding arrangement as claimed in claim 8, wherein the shuttle body assembly comprises:
the shuttle race body (101) comprising a main portion (103) formed with an annular stepped portion at an open end thereof, and a shuttle body holder (104) fixedly secured to the open end, an annular groove (106) being defined by the stepped portion and the shuttle body holder (104), and
the shuttle body (102) disposed within the main portion (103) and having a sliding rail (105) slidably fitted with the annular groove (106);
the first sliding portion comprising a surface of the annular groove (106), and the second sliding portion comprising the sliding rail (105).

10. The relatively sliding arrangement as claimed in claim 9, wherein the shuttle race body (101) is entirely formed of silicon carbide and the shuttle body (102) is entirely formed of silicon carbide.

11. The relatively sliding arrangement as claimed in claim 9, wherein the shuttle body assembly further comprises:
- a boss portion (109) integrally extending from the main portion (103) and formed with a central hole (108) and with a radial bore (128);
- a drive shaft (107) fitted in the central hole (108), the drive shaft (107) being formed with a central oil passage (124) in fluid communication with the oil supply pump (126), the drive shaft (107) being also formed with a radial oil inlet port (127) in communication with the central oil passage (124) and the radial bore (128);
- a sleeve (120) fixedly secured over the boss portion (109), the sleeve (120) being formed with a radial oil passage; and
- the main portion (103) having a flanged portion at the open end portion and being formed with an axial oil passage (130) at the flanged portion in fluid communication with an annular gap defined between the annular groove (106) and the sliding rail (105), wherein the oil regulation means comprises the oil inlet port (127), the radial bore (128), the radial oil passage formed in the sleeve (120), the axial oil passage (130), a connecting tube (129) connecting between the radial oil passage and the axial oil passage (130), and a regulating valve (132) disposed in the central hole (108) of the boss portion (109), the regulating valve (132) being threadingly engaged with the oil passage (124) for controllably opening the oil inlet port (127).

12. A relatively sliding arrangement comprising:
at least one sliding member having a first sliding portion;
at least one opponent sliding member having a second sliding portion, the first and the second sliding portions being in relative sliding contact with each other and at least one of the first and second sliding portions being formed of a ceramic material having high hardness and high wear resistance; and
means for supplying a minute amount of lubrication oil to the sliding portions, wherein the means for supplying comprises a lubrication oil supply pump and a regulation means for regulating the lubrication oil amount to be supplied to the relatively sliding portions; the sliding member comprises a needle bar (209) provided reciprocatingly and having one end fixed with a sewing needle (211); and the opponent sliding member comprises a guide means (207,208) for slidably guiding the reciprocal movement of the needle bar, the first sliding portion comprising an outer peripheral surface of the needle bar, and the second sliding portion comprising an inner peripheral surfaces of the guide means (207,208); the needle bar, the sewing needle and the guide means being components of a needle bar mechanism of a sewing machine.

13. The relatively sliding arrangement as claimed in claim 12, wherein a sprayed layer of chromic oxide is formed over the outer peripheral surface of the needle bar, and the guide means is formed entirely of silicon carbide.

14. The relatively sliding arrangement as claimed in claim 12, wherein the needle bar mechanism comprises:
- a rotation shaft (201) formed with a central oil passage (222), an annular groove (221) at an outer peripheral surface of the shaft (201), and a radial oil inlet port (221a) in communication with the central oil passage (222);
- a bearing (202) for rotatably supporting the rotation shaft (201), the bearing (202) being in fluid communication with the oil supply pump (219) and with the annular groove (221);
- a swing arm (203) having a first end portion connected to the rotation shaft (201) and having a second end portion, the swing arm (203) being formed with a control female thread (224), a communication hole (225) communicating with the oil passage (222) and the control female thread (224), a discharge passage (226) extending along a length of the swing arm (203) and communicating with the control female thread (224), and a discharge port (227) in communication with the discharge passage (226);
- the guide means (207,208) comprising needle bar bushings (207,208) having the inner peripheral surfaces through which the needle bar slidingly reciprocates;
- a needle bar connecting stud (212) fixed to the needle bar, the needle bar connecting stud (212) having a stem portion (213);
- a needle bar joint (204) formed with a first and a second through holes (205,206) in communication with each other, the stem portion (213) being slidingly inserted into the second through hole (206), the second end portion of the swing arm (203) being slidingly inserted into the first through hole (205), and the discharge port (227) being opened to the first through hole (205);
- a rectangular piece (126) through which the stem portion (213) extends; and
- a needle bar guide member (215) formed with a guide groove (218) with which the rectangular piece (216) is slidingly engaged,
wherein the regulation means comprises the oil passage (222), the inlet port (221a), the communication hole (225), the control female thread (224), the discharge passage (226), the discharge port (227), a control male screw (230) threadingly engaged with the control female thread (224), and a spherical piece (229) disposed in the control female thread (224) for controllably opening the communication hole (225).

15. The relatively sliding arrangement as claimed in claim 14, wherein the stem portion (213) is formed with a central bore and a radial passage (232) for providing communication between the second through hole (206) and the central bore, wherein the needle bar mechanism further comprises a felt member (217) inserted into the central bore of the stem portion (213) for receiving therein the lubrication oil and for supplying the oil to the rectangular piece (216) and to the needle bar guide member (215).

16. The relatively sliding arrangement as claimed in claim 15, wherein a second sliding member comprises the second end portion of the swing arm (203) and the second opponent sliding member comprises an inner peripheral surface of the first through hole (205), the outer peripheral surface of the second end portion of the swing arm (203) being provided with a sprayed layer of chromic oxide, and the needle bar joint (204) being entirely formed of silicon carbide.

17. The relatively sliding arrangement as claimed in claim 16, wherein a third sliding member comprises the stem portion (213) and a third opponent sliding member comprises the second through hole (206) and the rectangular piece (216), an outer peripheral surface of the stem portion (213) being provided with a sprayed layer of chromic oxide and the needle bar joint (204) and the rectangular piece (216) being entirely formed of silicon carbide.

18. The relatively sliding arrangement as claimed in claim 17, wherein a fourth sliding member comprises the rectangular piece (216) and a fourth opponent sliding member comprises the needle bar guide member (215), the rectangular piece (216) being formed entirely of silicon carbide, and a surface of the guide groove (218) being provided with a sprayed layer of chromic oxide.

19. A relatively sliding arrangement comprising:
at least one sliding member having a first sliding portion;
at least one opponent sliding member having a second sliding portion, the first and the second sliding portions being in relative sliding contact with each other and at least one of the first and second sliding portions being formed of a ceramic material having high hardness and high wear resistance; and
means for supplying a minute amount of lubrication oil to the sliding portions, wherein the means for supplying comprises a lubrication oil supply pump and a regulation means for regulating the lubrication oil amount to be supplied to the relatively sliding portions; the sliding member comprises a pair of feed bars (301,302); and the opponent sliding member comprises support means (303, 305) for slidingly supporting the pair of feed bars in a fabric piece feeding direction, the pair of feed bars and the support means being components of a fabric piece feed mechanism of a sewing machine.

20. The relatively sliding arrangement as claimed in claim 19, wherein the fabric piece feed mechanism comprises:
the pair of bars (301, 302) comprising a main feed bar (301) and a differential feed bar (302), the main and differential feed bars having front portions and rear portions; and
the support means (303, 305) comprising a front slide block )305) slidingly engageable with the front portions of the main and differential feed bars, and a rear slide block (305) slidingly engageable with the rear portions of the main and differential feed bars.

21. The relatively sliding arrangement as claimed in claim 20, wherein the surfaces of the main and differential feed bars are sprayed with chromic oxide and the slide blocks are entirely formed of silicon carbide.

22. The relatively sliding arrangement as claimed in claim 20, wherein the front and rear slide blocks (305,303) are formed with bores and the fabric piece feed mechanism further comprises:
an eccentric shaft (306) slidably extending into the bore of the front slide block (305) for providing a vertical motion thereof, the eccentric shaft (306) being formed with an oil passage (313) in communication with the oil supply pump (312), and a oil discharge port (314) in communication with the oil passage (313) for discharging the oil to an outer surface of the eccentric shaft;
a support shaft (304) inserted into the bore of the rear slide block )303), the support shaft (304) being formed with an oil passage (313) in communication with the oil supply pump (312), and an oil discharge port (314) in communication with the oil passage (313) for discharging the oil to an outer surface of the support shaft;
and wherein the oil regulation means comprises the oil passage (313), the oil discharge port (314) and control screw (309) disposed in alignment with the oil discharge port (314) for controlling the opening of the discharge port of both the eccentric shaft and the support shaft.

* * * * *